United States Patent Office 2,808,564
Patented Oct. 1, 1957

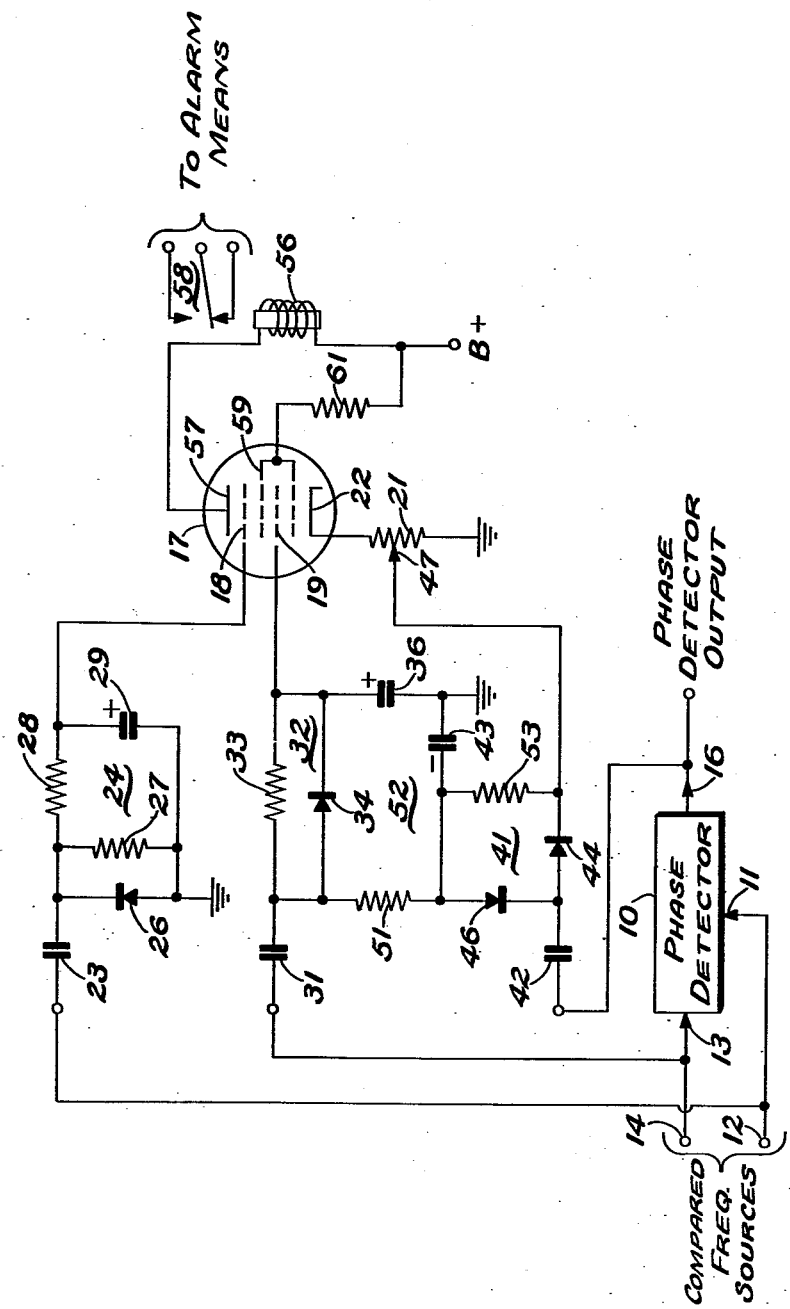

2,808,564

PHASE DETECTOR FAULT INDICATOR

William C. Brandt and Luther W. Couillard, Cedar Rapids, Iowa, Herbert P. Jacobson, Quito, Ecuador, and Emil L. Martin and William C. Perkins, Cedar Rapids, Iowa, assignors to Collins Radio Company, Cedar Rapids, Iowa, a corporation of Iowa Application July 16, 1956, Serial No. 598,169

6 Claims. (Cl. 324—82)

This invention relates to means for indicating faults in the operation of a phase detector such as when its inputs have insufficient amplitude or when they are not in phase-lock.

Phase detectors are commonly used in frequency-stabilization systems. For example, frequency-stabilization systems often use a phase detector to simultaneously compare the output frequency of a variable oscillator to a more stable frequency, such as may be obtained from a crystal-controlled source. The variable-oscillator frequency and a selected crystal harmonic are therefore provided as the two inputs of the phase-detector circuit.

A correcting device, such as a feedback-controlled system, may be controlled by the output of the phase detector to maintain the variable-oscillator frequency in exact alignment with the selected harmonics of the crystal-controlled source. Thus, the output frequency of the variable oscillator is stabilized.

When such variable oscillator is tuned to precisely the same frequency provided from the crystal source, the phase detector will provide a direct-current output, which will have an amplitude that is a function of the phase between its two input signals.

However, when there is a frequency difference between the two inputs of the phase detector, it will provide an alternating-current output, which will have a frequency equal to the frequency difference between its two inputs.

Frequency-stabilized systems, such as stabilized master oscillators, are often complex. In some cases, it is essential to have an immediate indication if a fault exists in the system. For example, a frequency-stabilized system may be used to generate the carrier frequency of a radio transmitter. If the device is not operating properly, it could angle modulate or provide the wrong carrier frequency output to thereby violate the rules of the Federal Communications Commission.

A fault in a frequency-stabilized device having such a phase detector will generally make itself apparent by failure of at least one of the input signals to the phase detector or by failure of the input signals to phase-lock.

It is, therefore, an object of this invention to provide means for indicating when the input signals to a phase detector are not in a phase-locked condition.

It is another object of this invention to provide a phase-detector fault indicator which indicates when either or both inputs are below a minimum-required amplitude value.

The invention includes electron control means having at least two control electrodes. Also, each phase-detector input and the phase-detector output is connected through a respective blocking condenser to a respective rectifying means, which provides a D. C. output proportional to the amplitude of its A. C. input.

One of the rectifying means, which receives one of the phase-detector inputs, has its D. C. output connected to one of the control electrodes of the electron control means.

The D. C. outputs of the remaining two rectifying means are connected in polarity opposition to the other control electrode to form a bridge network. One of these rectifying means, which receives the phase-detector output, is preferably provided with a non-frequency sensitive voltage-multiplying arrangement, such as a voltage doubler, because of the generally low amplitude of phase-detector outputs.

The polarities of the three rectifying means are arranged to maintain the electron control means in a given conduction state, such as either conduction or non-conduction, when the two rectifying means connected to the phase-detector inputs are receiving A. C. signals, and the rectifying means connected to the phase-detector output is not receiving an A. C. signal. A change in the phase-detector input-output conditions changes the conduction state of the electron control means.

Furthermore, additional bias means can be included by the inevntion for one or both of the control electrodes, thereby regulating the senstivity of its alarm indication.

Further objects, features, and advantages of this invention will become aparent to one skilled in the art upon further study of the specification and the single figure.

Now referring to the invention in more detail, the figure illustrates an embodiment of the invention which is used to determine faults in the input-output relationship of a phase detector 10. It receives a first input 11 from a terminal 12 that may be connected to a radio-frequency source. Another input 13 of phase detector 10 is connected to a second input terminal 14 to recive a similar signal.

Phase detector 10 compares its two inputs 11 and 13 and indicates when they continuously have the same frequency by providing an output 16 that is D. C. When inputs 11 and 13 differ in frequency, output 16 will be A. C. which will have a frequency equal to the difference between the frequencies of inputs 11 and 13.

The invention uses a tube 17, which includes two grids 18 and 19, and may be a type of gated-beam tube, known in the industry as a 6BN6, which serves well because of its amplitude-limiting action and constant cathode current characteristics.

A potentiometer 21 is connected between the cathode 22 of tube 17 and ground to bias the tube to a non-conducting condition when grids 18 and 19 are at ground potential, i. e. both grids 18 and 19 are then biased below cut-off.

Input 11 of phase detector 10 is also provided through a blocking capacitor 23 to a rectification circuit 24 which includes diode 26, resistors 27 and 28, and charging capacitor 29. Resistor 28 is connected in series between blocking capacitor 23 and grid 18 of tube 17. Charging capacitor 29 is connected between grid 18 and ground; and resistor 27 is connected between ground and the other side of resistor 28. Diode 26 is connected across resistor 27 and has a polarity which charges capacitor 29 to a positive voltage, that biases grid 18 above cut-off when phase-detector input 11 exceeds a minimum amplitude.

The other phase-detector input 13 is further connected through a blocking capacitor 31 to another rectification circuit 32 that comprises a resistor 33, diode 34 and capacitor 36. Resistor 33 is connected between capacitor 31 and grid 19 of tube 17. Capacitor 36 is connected between grid 19 and ground, and diode 34 is connected across resistor 33 with a polarity that charges capacitor 36 to a positive voltage that is sufficient to bias the other grid 19 above cut off when phase detector input 13 exceeds a minimum amplitude. If the amplitude of phase detector input 13 is large compared to the amplitude of the lowest frequency output of detector 10, when its inputs are out of phase-lock, capacitor 31 is made small to attenuate the input signal to rectifier 32.

A further rectifier circuit 41 is provided and is a voltage-doubler type of rectifier. Its input is connected to output 16 of phase detector 10. Rectifier circuit 41 includes capacitors 42 and 43 with diodes 44 and 46. Capacitor 42 has another function, since it blocks any direct-voltage output from phase detector 10 but passes any A. C. component. Diode 44 is connected serially between capacitor 42 and tap 47 of potentiometer 21, which has a relatively low resistance to ground. Second diode 46 has one end connected to capacitor 42 and has like-series polarity with respect to first diode 44. Second capacitor 43 of the voltage doubler is connected between ground and the other end of diode 46. Rectifier circuit 41 charges capacitor 43 to a negative direct-voltage which has approximately twice the value of the peak amplitude of any alternating voltage provided at phase-detector output 16. The time-constants of voltage doubling circuit 41 are long to prevent substantial periodic discharging of its capacitors at its lowest received frequencies.

Another resistor 51 is connected serially between diodes 34 and 46; and it effectively connects in series the charged outputs of rectifier circuits 32 and 41 to form a bridge-type of circuit 52. The D. C. voltage across resistor 33 will be proportional to detector input 13. Consequently, the voltage across capacitor 36 will be the sum of the opposite-polarity voltages across resistor 33 and across capacitor 43. The difference between these voltages is sensed by grid 19, since it is connected across capacitor 36. There will be very little current flow within circuit 52 because of the high-impedance components which isolate it from ground with respect to direct-current flow. Hence, when no charge exists on capacitor 43, the positive charge on capacitor 36 can maintain grid 19 above cutoff.

Furthermore, another resistor 53 connects serially between tap 47 and resistor 51. Resistor 53 enables a D. C. connection between tap 47 and grid 19. Accordingly, the setting of tap 47 controls the bias of grid 19. Resistor 53 should have a long time constant with capacitor 36 to prevent its discharge at very low charging frequencies. Resistor 53 also enables a grid-leak for grid 19.

A relay 56 is connected in series between the plate 57 of tube 17 and a B-plus voltage supply. Relay 56 has contacts 58 which are connected to alarm means (not shown), which might be a light, buzzer, or arrangement for shutting off equipment or any combination of these, etc.

Any other grids of tube 17 are operably connected. Therefore, accelerator electrode 59 is connected through a resistor 61 to the B-plus source.

In operation, tube 17 is connected to normally conduct when phase-detector 10 is operating properly. Accordingly, a fault in the system is indicated by non-conduction of tube 17. Thus, the illustrated embodiment is fail-safe because it will give an alarm indication if a fault develops within itself that interrupts conduction of tube 17.

When phase detector 10 receives phase-locked inputs, its output will be a D. C. voltage, which will be blocked by capacitor 42. Accordingly, charging capacitor 43 of voltage-doubler rectifying circuit 41 will not be charged. Then, if phase-detector input 13 is above a minimum-required value, grid 19 will be biased above cutoff to permit conduction by tube 17. Similarly, if phase-detector input 11 is above a minimum-required value, the other grid 18 will also be biased above cutoff to allow conduction by tube 17. As a result, tube 17 will be in a conducting state, since this requires that both grids 18 and 19 be simultaneously biased above cutoff.

If either of the two phase-detector inputs 11 or 13 should fail, the positive bias of the respective rectifying circuit 24 or 32 will fail and will go to ground potential, which is below cutoff for their respective grids 18 or 19, because of the cathode bias provided by potentiometer 21. Then, plate-current conduction will cease. Therefore, relay 56 will be de-energized, and its contacts 58 will change position to give an alarm or disable the equipment.

Furthermore, if the two phase-detector inputs 11 and 13 remain but are not in phase-lock, an A. C. output is provided from phase-detector 10 which will charge capacitor 43 to a negative voltage that will oppose the positive voltage on capacitor 36 in circuit 52 and drive grid 19 below cutoff, thus interrupting the plate-current and actuating the contacts of relay 52.

Tap 47 of potentiometer 21 is used to adjust the sensitivity of the alarm circuit. It controls the bias between cathode 22 and grid 19 of tube 17. It is preferably set to provide the lowest stable biasing voltage which will bias grid 19 above cutoff when a phase-lock exists between the phase-detector inputs. Then, a minimum amount of amplitude for any A. C. component in the phase-detector output will cause grid 19 to drop below cutoff and indicate lack of phase-lock.

While a particular form of the invention has been shown and described, it is to be understood that the invention is capable of many modifications. Changes, therefore, in construction and arrangement may be made without departing from the scope of the invention as given by the appended claims.

What we claim is:

1. Fault detection means operating with a phase detector having a pair of inputs and an output, comprising electron control means having at least two control electrodes, first rectification means having its input connected in series with one of said phase-detector inputs, with the output of said first rectification means connected to one of said control electrodes, second rectification means having its input connected in series with the other of said phase-detector inputs, a third rectification means, means for blocking direct-current and for passing alternating-current connected between said phase-detector output and the input to said third rectification means, with the outputs of said second and third rectification means being opposite polarity voltages, the outputs of said second and third rectification means each being serially connected to the other of said control electrodes, with the polarities of the outputs of said first, second and third rectification means determining the conduction state of said electron control means, whereby a fault in any of said phase-detector inputs and output changes the conduction state of said electron control means.

2. Fault detection means operating with a phase detector comprising electron control means having a pair of control electrodes, a first rectification means having its output connected to one of its control electrodes, means for blocking direct-current and passing alternating-current connected between the input of said first rectification means and one input of said phase detector, second and third rectification means having opposite-polarity outputs, the outputs of said second and third rectification means connected in common to the other of said control electrodes, second means for blocking direct-current and passing alternating-current connected between the input of said second rectification means and the other input of said phase detector, and third means for blocking direct-current and passing alternating-current connected between the input to said third rectification means and the output of said phase detector, whereby the conduction state of said electron control means indicates the existence of a fault in the input-output conditions of said phase detector.

3. Fault detection means used with a phase detector, comprising an electron tube having at least two control grids, a first rectifier circuit including a charging capacitor, with its charging capacitor connected to one of said control grids, a first blocking capacitor connected between the input to said first rectifier circuit and one input of said phase detector, with said first rectification circuit polarized to provide a positive direct-voltage across its charging capacitor for biasing said one control grid above cutoff, a second rectifier circuit including another charging capacitor, and a third rectifier circuit including a further charging capacitor, with said another charging capacitor and said further charging capacitor each connected to the other of said grids, a second blocking capacitor connected between the input of said second rectifier circuit and the other input of said phase detector, with said another charging capacitor polarized by said second rectifier circuit with a positive direct-voltage, a third blocking capacitor connected between the input to said third rectifier circuit and the output of said phase detector to pass any alternating-current output from said phase detector, with said further charging capacitor polarized by said third rectification circuit with a negative direct-voltage, and alarm means actuated by the non-conduction of said electron tube.

4. Fault detection means used with a phase detector, comprising electron discharge means having at least two control grids, a potentiometer connected between the cathode of said discharge means and ground, relay means connected serially with the plate of said electron discharge means, a first rectifier circuit polarized to provide a positive direct-current output, with its output connected to one of said control grids, a first blocking capacitor connected between the input of said first rectifier circuit and one input of said phase detector, a second rectifier circuit polarized to provide a positive direct-voltage output, with its output connected to the other of said control grids, a second blocking capacitor connected between the input of said second rectifier circuit and the other input to said phase detector, a third rectifier circuit with its output polarized to provide a negative direct-voltage, a third blocking capacitor connected between the input of said third rectifier circuit and the output of said phase detector, bridge means commonly connecting the outputs of said second and third rectifier circuits to said other control grid, and impedance means connecting the tap of said potentiometer to said other control grid to adjust its bias.

5. Fault detection means used with a phase detector, comprising a gated-beam electron tube having a pair of control grids, relay means connected serially to the plate of said tube, a potentiometer connected between the cathode of said tube and ground, a first rectifier circuit polarized to provide a positive direct-voltage output, with its output connected to one of said control grids, a blocking capacitor connected between the input of said first rectifier circuit and one input of said phase detector, a second rectifier circuit polarized to provide a positive direct-voltage output, a second blocking capacitor connected between the input of said second rectifier circuit and the other input of said phase detector, a third rectifier circuit polarized to provide a negative direct-voltage output, resistor means connecting the outputs of said second and third rectifier circuits to the other of said control grids, a third blocking capacitor connected between the input of said third rectifier circuit and the output of said phase detector, and the tap of said potentiometer connected through said resistor means to said other control grid.

6. Fault detection means used with a phase detector, comprising a gated-beam tube having at least a pair of control grids, a first blocking capacitor having one end connected to one input of said phase detector; a first rectifier circuit including a first resistor serially connected between the other end of said first blocking capacitor and one of said control grids, a second resistor connected between ground and said other end of said first blocking capacitor, a diode connected across said resistor, and a charging capacitor connected between said one control grid and ground, with said diode polarized to positively charge said charging capacitor; a second blocking capacitor connected on one side to the other input of said phase detector; a second rectifier circuit comprising a resistor connected between the other side of said second blocking capacitor and the other of said grids, a charging capacitor connected between ground and said other grid, and a diode connected across said resistor with a polarity that obtains a positive direct-voltage on said charging capacitor, a third blocking capacitor having one end connected to the output of said phase detector; a voltage-doubling rectifier circuit including first and second diodes connected with like series polarity, a common point between said diodes connected to the other side of said third blocking capacitor, a charging capacitor connected between ground and the remaining end of said first diode, with the remaining end of said second diodes connected to the tap of said potentiometer, and said diodes polarized to provide a negative direct-voltage on their charging capacitor; a resistor connected between the tap of said potentiometer and the ungrounded side of the charging capacitor in said voltage-doubling rectifier circuit, and another resistor connected between the ungrounded end of the charging capacitor in said voltage-doubling rectifier circuit and said other end of said second blocking capacitor, and relay means connected serially to the plate of said tube.

References Cited in the file of this patent
UNITED STATES PATENTS

| | | |
|---|---|---|
| 2,522,139 | Schoenbaum | Sept. 12, 1950 |
| 2,613,271 | Trevor | Oct. 7, 1952 |